(12) United States Patent
Steele et al.

(10) Patent No.: US 10,961,824 B2
(45) Date of Patent: Mar. 30, 2021

(54) LATERAL TUBING SUPPORT OF A MULTI-LATERAL JUNCTION ASSEMBLY

(71) Applicant: Halliburton Energy Services, Inc., Houston, TX (US)

(72) Inventors: David Joe Steele, Arlington, TX (US); Matthew Bradley Stokes, Keller, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/781,529

(22) PCT Filed: Aug. 2, 2017

(86) PCT No.: PCT/US2017/045128
§ 371 (c)(1),
(2) Date: Jun. 5, 2018

(87) PCT Pub. No.: WO2019/027454
PCT Pub. Date: Feb. 7, 2019

(65) Prior Publication Data
US 2020/0270969 A1    Aug. 27, 2020

(51) Int. Cl.
*E21B 41/00* (2006.01)
*E21B 17/18* (2006.01)
*F16L 3/12* (2006.01)

(52) U.S. Cl.
CPC .......... *E21B 41/0042* (2013.01); *E21B 17/18* (2013.01); *F16L 3/1222* (2013.01)

(58) Field of Classification Search
CPC ........ E21B 17/00; E21B 17/02; E21B 17/023; E21B 17/18; E21B 41/0035; E21B 41/0042
See application file for complete search history.

(56) References Cited

U.S. PATENT DOCUMENTS 4,834,825 A * 5/1989 Adams .................... F16L 39/00
138/111
5,467,826 A    11/1995 Miller
(Continued)

FOREIGN PATENT DOCUMENTS

WO    WO 2014/126917 A1    8/2014
WO    WO 2016/000068 A1    1/2016

OTHER PUBLICATIONS

International Search Report and the Written Opinion of the International Search Authority, or the Declaration, dated Apr. 27, 2018, PCT/US2017/045128, 18 pages, ISA/KR.

*Primary Examiner* — Tara Schimpf
(74) *Attorney, Agent, or Firm* — Haynes and Boone, LLP (57) ABSTRACT

A downhole apparatus can include a first lateral tubing support that comprises: a body; a first passage extending through the body; and a second passage extending through the body. The first and second passage are spaced in parallel arrangement, and the body extends continuously and uninterruptedly in a direction transverse to the parallel directions of extension of the first and second passages, from the first passage to the second passage. The lateral tubing string can also include a first tubular and a second tubular spaced in parallel arrangement. The first passage is configured to at least partially encircle the first tubular and the second passage is configured to at least partially encircle the second tubular, with the first lateral tubing support increasing a radial and/or axial compressive load rating of the lateral tubing string.

20 Claims, 10 Drawing Sheets

(56) References Cited

U.S. PATENT DOCUMENTS

| | | | |
|---|---|---|---|
| 5,655,602 A | 8/1997 | Collins | |
| 5,878,815 A | 3/1999 | Collins | |
| 6,089,320 A | 7/2000 | LaGrange | |
| 6,209,649 B1 | 4/2001 | Pringle et al. | |
| 6,336,507 B1* | 1/2002 | Collins | E21B 7/043 166/313 |
| 6,729,410 B2 | 5/2004 | Steele | |
| 6,907,930 B2 | 6/2005 | Cavender et al. | |
| 6,915,847 B2 | 7/2005 | Brockman | |
| 7,100,693 B2 | 9/2006 | Collins et al. | |
| 7,497,264 B2 | 3/2009 | Moody et al. | |
| 8,397,819 B2 | 3/2013 | Tunget | |
| 8,701,775 B2 | 4/2014 | Steele | |
| 8,826,991 B2 | 9/2014 | Steele et al. | |
| 2002/0014333 A1 | 2/2002 | Ohmer | |
| 2003/0062717 A1 | 4/2003 | Thomas et al. | |
| 2005/0241830 A1* | 11/2005 | Steele | E21B 43/103 166/313 |
| 2006/0201677 A1* | 9/2006 | Moody | E21B 41/0042 166/313 |
| 2007/0089875 A1* | 4/2007 | Steele | F16L 9/19 166/50 |
| 2009/0188671 A1 | 7/2009 | Jacob et al. | |
| 2012/0305266 A1 | 12/2012 | Steele et al. | |
| 2015/0233190 A1 | 8/2015 | Wolf et al. | |
| 2015/0275587 A1 | 10/2015 | Wolf et al. | |
| 2016/0273312 A1* | 9/2016 | Steele | E21B 33/12 |
| 2017/0130537 A1 | 5/2017 | Parlin | |
| 2020/0080402 A1* | 3/2020 | Lang | E21B 7/061 |

* cited by examiner

LATERAL TUBING SUPPORT OF A MULTI-LATERAL JUNCTION ASSEMBLY

PRIORITY

The present application is a U.S. National Stage patent application of International Patent Application No. PCT/US2017/045128, filed on Aug. 2, 2017, the benefit of which is claimed and the disclosure of which is incorporated herein by reference in its entirety.

TECHNICAL FIELD

The present disclosure relates generally a multi-lateral junction assembly, and specifically, to a lateral tubing support of a multi-lateral junction assembly that increases the burst and collapse strength of a lateral leg.

BACKGROUND

The present invention relates generally to operations performed and equipment utilized in conjunction with a subterranean well and, in an embodiment described herein, more particularly provides a multi-lateral junction assembly and methods of using same.

Cross-sectional area in a wellbore is a limited commodity. The wellbore must accommodate equipment and tubing strings passing therethrough, and must provide sufficient flow area for efficient production or injection of fluids therethrough. Often, where multiple tubing strings are used in a single wellbore, conventional circular cross-section tubing strings have merely been positioned side-by-side in the wellbore. Although this may be the easiest solution, it is also very inefficient in utilizing the available cross-sectional area in the wellbore. One solution is to manufacture the tubing strings so that at least one of the tubing strings has a generally D-shaped cross-section. When positioned side-by-side in the wellbore, the two tubing strings together have a smaller cross-section than two tubing strings having circulator cross-sections, but together occupy a substantial portion of the cross-sectional area of the wellbore, and are therefore able to utilize more of this area for fluid flow, access, etc. However, D-shaped tubes have a relatively low burst and collapse strength as compared to a circular tube having equivalent cross-sectional area and wall thickness.

Therefore, it may be seen that it would be desirable to provide a multi-lateral junction assembly that efficiently utilizes the available cross-sectional area in a wellbore, which accommodates additional lines therein, and that has increased burst and collapse strength.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Illustrative embodiments and related methods of the present disclosure are described below as they might be employed in a lateral tubing support of a multi-lateral junction assembly. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "down-hole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" may encompass both an orientation of above and below. The apparatus may be otherwise oriented (rotated 90 degrees or at other orientations) and the spatially relative descriptors used herein may likewise be interpreted accordingly.

Figure 1A:
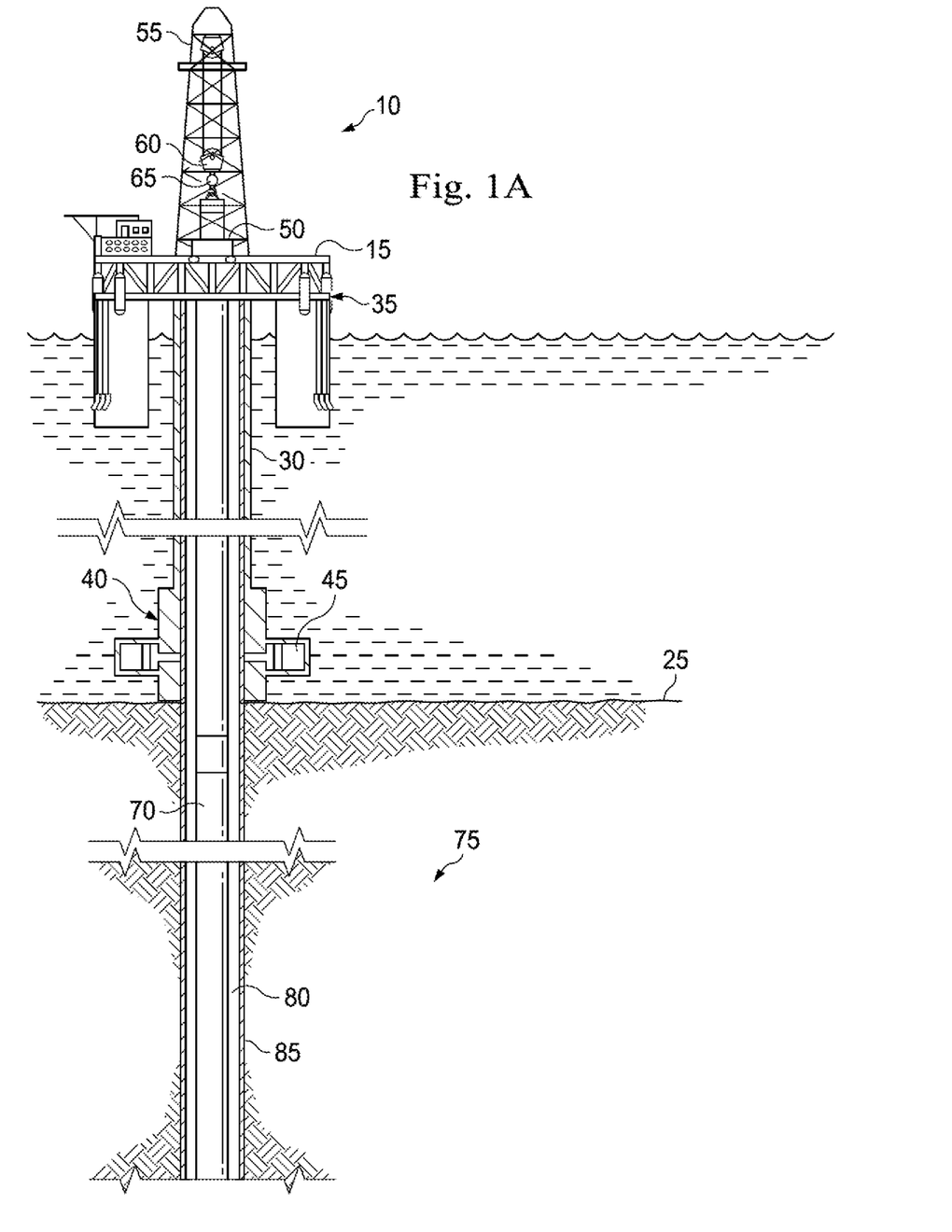
FIGS. 1A and 1B together are a schematic illustration of an offshore oil and gas platform operably coupled to a multi-lateral junction assembly having a lateral tubing support, according to an exemplary embodiment of the present disclosure.
Figure 1B:
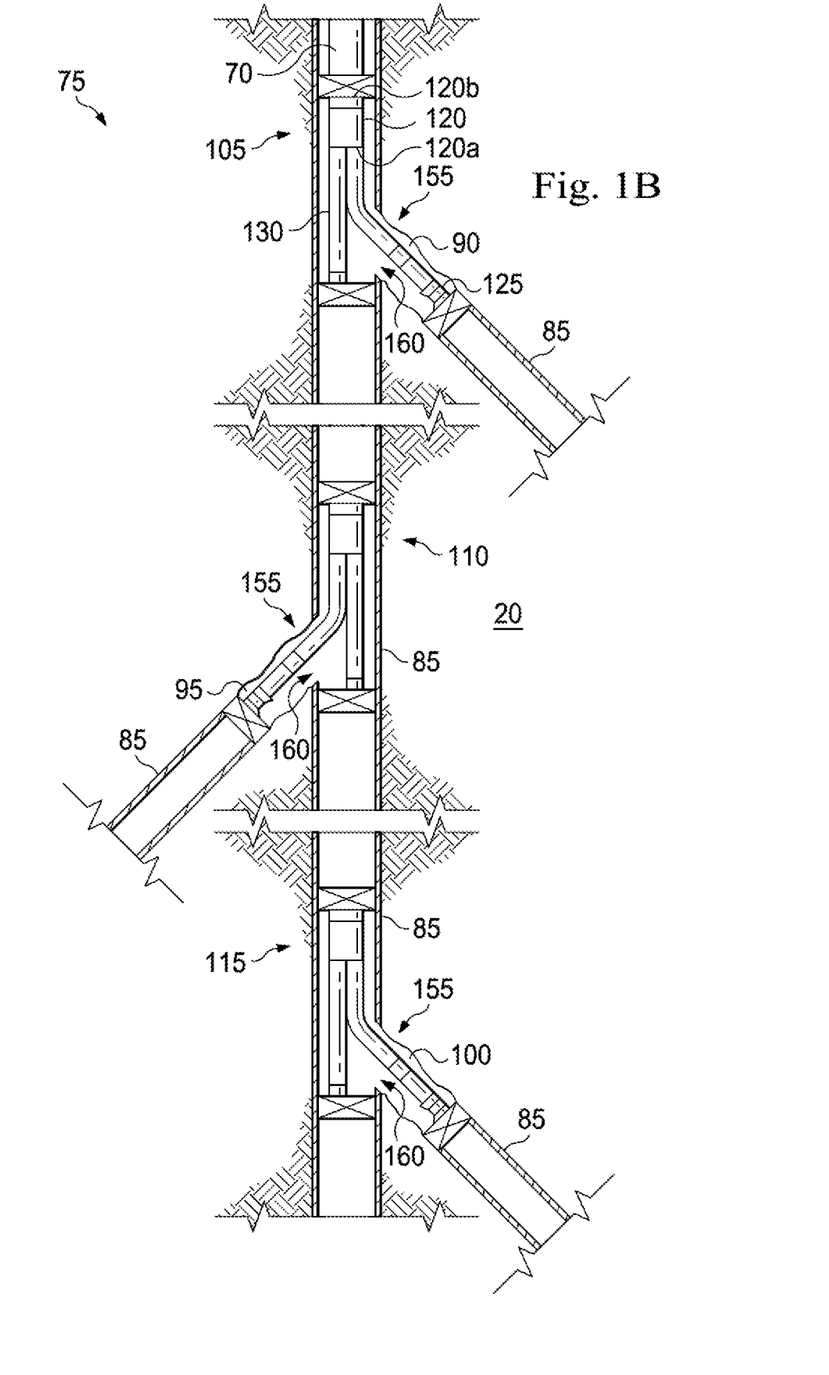

FIGS. 1A and 1B together are a schematic illustration of an offshore oil and gas platform generally designated 10, operably coupled by way of example to a multi-lateral junction assembly having a lateral tubing support, according to the present disclosure. Such an assembly could alternatively be coupled to a semi-sub or a drill ship as well. Also, even though FIGS. 1A and 1B depict an offshore operation, it should be understood by those skilled in the art that the apparatus according to the present disclosure is equally well suited for use in onshore operations. By way of convention in the following discussion, though FIGS. 1A and 1B depict a vertical wellbore, it should be understood by those skilled in the art that the apparatus according to the present disclosure is equally well suited for use in wellbores having other orientations including horizontal wellbores, slanted wellbores, multilateral wellbores or the like.

Referring still to the offshore oil and gas platform example of FIGS. 1A and 1B, a semi-submersible platform 15 may be positioned over a submerged oil and gas formation 20 located below a sea floor 25. A subsea conduit 30 may extend from a deck 35 of the platform 15 to a subsea wellhead installation 40, including blowout preventers 45. The platform 15 may have a hoisting apparatus 50, a derrick 55, a travel block 60, and a hook 65 for raising and lowering pipe strings, such as a substantially tubular, axially extending tubing string 70.

As in the present example embodiment of FIGS. 1A and 1B, a well system 75, which includes a main borehole or main wellbore 80, extends through the various earth strata including the formation 20, with a portion of the wellbore 80 having a casing string 85 cemented therein. The well system 75 also includes lateral wellbores 90, 95, and 100 that intersect with the main wellbore 80. However, this disclosure is not limited at all to the particular configuration of the well system 75, such as the number or arrangement of the wellbores 90, 95, and 100, depicted in FIGS. 1A and 1B.

In an exemplary embodiment, a wellbore junction assembly or a multi-branch inflow control junction ("MIC junction"), such as a multi-lateral junction assembly 105 is installed in the wellbore section 90, with identical or similar multi-lateral junction assemblies 110 and 115 being installed in the wellbore sections 95 and 100, respectively, to provide controlled fluid communication and access between the wellbore sections. The assembly 105 comprises a tubing string connector such as a y-connector 120; a first tubing string 125; and a second tubing string 130, with the first and second tubing strings 125, 130 arranged in side-by-side or parallel arrangement and each attached to an end 120a of the connector 120. The assembly 105 is connected with the tubing string 70 at an end 120b of the connector 120. In some embodiments, casing is run between the connector 120 and a liner hanger. Then, on a separate trip downhole, the tubing string 70 is run in the well and a seal assembly at the bottom is stabbed into a polish bore receptacle and is sealingly engaged into a liner hanger. The assembly 105 is shown in a first configuration in FIGS. 1A and 1B, with the first tubing string 125 extending within the wellbore 90. In an exemplary embodiment, the y-connector 120 is configured to attach to the second tubing string 130 when the second tubing string has a generally circulator cross-section and is configured to attached to the first tubing string 125 when at least a portion of the first tubing string 125 has a generally D-shaped cross-section. Thus, when positioned side-by-side in the wellbore 80, the first and second tubing strings 125 and 130 together have a small cross-section. Generally, the first and second tubing strings 125 and 130, together, have a smaller cross-section than the casing string 85. D-shaped tubes generally have a relatively low burst and collapse strength as compared to a circular tube having equivalent cross-sectional area and wall thickness. Thus, in some embodiments, strengthening the first tubing string 125 when the first tubing string 125 has a D-shaped connection that connects to the y-connector 120 increases the burst and collapse strength of the assembly 105 but also maintains the small cross-section of the first and second tubing strings 125 and 130 when positioned side-by-side.

Figure 2:
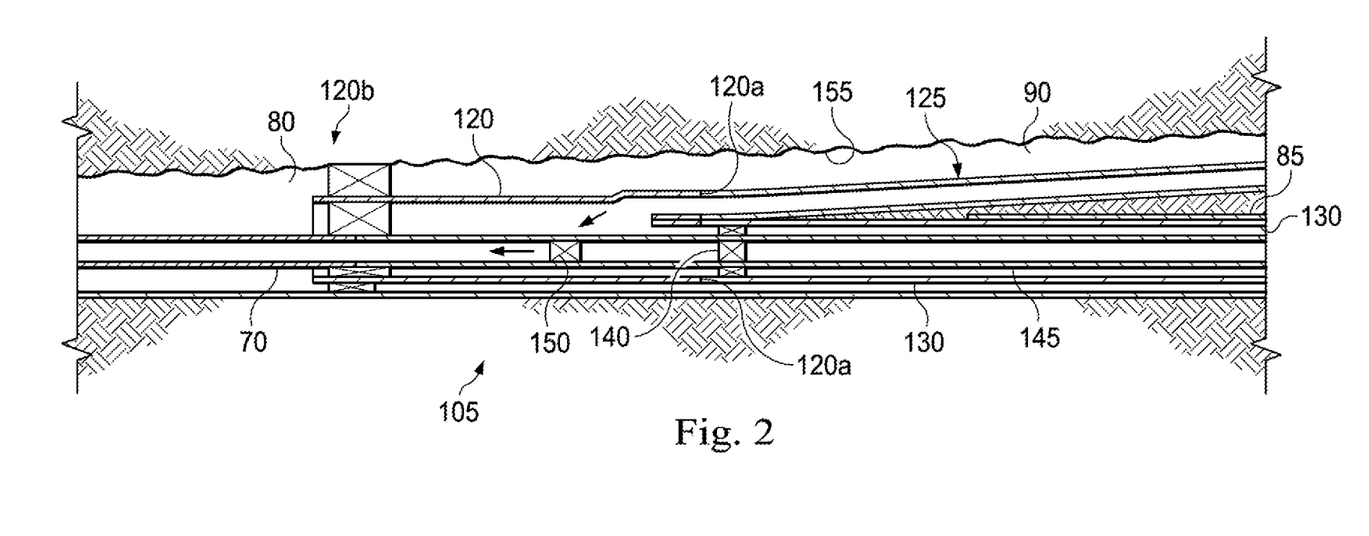
FIG. 2 is a schematic illustration of the multi-lateral junction assembly of FIGS. 1A and 1B, according to an exemplary embodiment of the present disclosure.

In this example and as illustrated in FIG. 2, the connector 120 provides fluid communication between the tubing string 70 and each of the tubing strings 125, 130. In addition, physical access is provided through the connector 120 between the first tubing string 125 and at least the second tubing string 130. Such access can allow a well tool (such as a shifting tool, running tool, retrieving tool, etc.) to be conveyed through the connector 120 and into the tubing string 130, for example, to operate a valve or other flow control device 140, which controls flow longitudinally through a production string 145 or main production string accommodated within the tubing string 130 and receives fluids from the wellbore section 95 and/or 100, or to operate a valve or other flow control device 150, which controls flow of a fluid from an annulus formed between the production string 145 and the second string 130 and/or the y-shaped connector 120, and into the production string 145. The production string 145 may be accommodated within the tubing string 70 or form a portion of the tubing string 70. Regardless, the production string 145 conveys fluids to the surface in this embodiment. Access through the connector 120 may be used for purposes other than operating flow control devices, in keeping with the scope of this disclosure. Chokes or other types of flow control devices can be used to regulate the flows of the fluids into the tubing string 70 above the tubing string 130. As multiple assemblies 105 may be present in one well, another tubing string 70 maybe attached to the bottom of the tubing string 145; or the tubing string 70 and 145 maybe one and the same.

The devices may be remotely controllable by wired or wireless means (e.g., by acoustic, pressure pulse or electromagnetic telemetry, by optical waveguide, electrical conductor or control lines, etc.), allowing for an intelligent completion in which production from the various wellbore sections can be independently controlled. In the same manner, injection into the various sections of the various wellbore sections can be independently monitored and/or controlled.

In the example depicted in FIGS. 1A and 1B, the wellbore sections 90, 95, and 100 are lined with the casing string 85, but a wellbore section 155 is uncased or open hole. A window 160 is formed through the casing string 85, with the wellbore sections 155 extending outwardly from each of the windows 160. The wellbore sections 90, 95, and 100 extending outwardly from the wellbore 155. However, other completion methods and configurations may be used, if desired. For example, the wellbore sections 90, 95, and 100 could be lined, with a liner therein being sealingly connected to the window 160 or other portion of the casing string 85, etc. Thus, it will be appreciated that the scope of this disclosure is not limited to any of the features of the well system 75 or the associated method described herein or depicted in the drawings.

Figure 4:
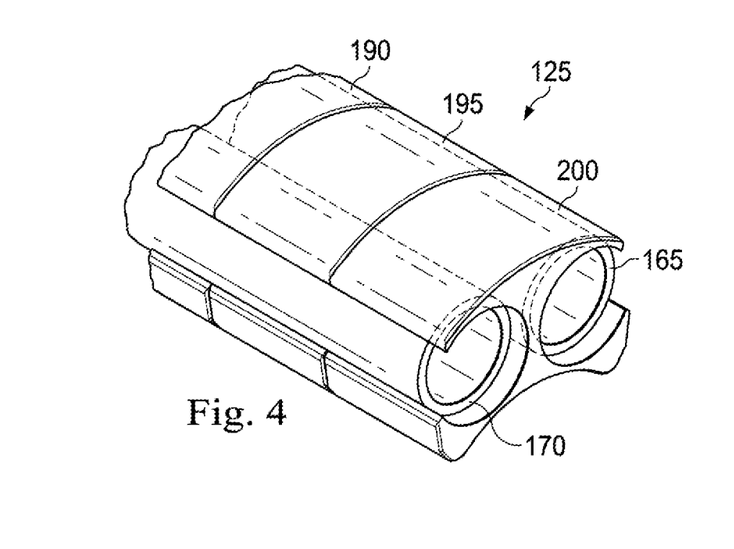
FIG. 4 is a perspective, cross-sectional view of a portion of the multi-lateral junction assembly of FIGS. 1A and 1B, the multi-lateral junction assembly comprising the lateral tubing support, according to an exemplary embodiment of the present disclosure.

In the example of FIG. 2, the first tubing string 125, which is a lateral tubing string, may include a first lateral tubing string, or a first tubular 165, and a second lateral tubing string, or a second tubular 170 (shown in FIG. 4) that conveys fluids (such as hydrocarbon fluids, oil, gas, water, steam, etc.) from the wellbore section 90 to the production strings 145 and/or 70 via the connector 120. In a similar manner, fluids are conveyed, via lateral tubing strings and from the wellbore sections 95 and 100, respectively. Generally, the first tubular 165 and a second tubular 170 are arranged or spaced in a side-by-side or parallel arrangement.

However, such production is not necessary in keeping with the scope of this disclosure. In other examples, fluid (such as steam, liquid water, gas, etc.) could be injected into one of the wellbore sections 90, 95, and 100 and another fluid (such as oil and/or gas, etc.) could be produced from the other wellbore section, fluids could be injected into more than one of the wellbore sections 90, 95, and 100, etc. Thus, any type of injection and/or production operations can be performed in keeping with the principles of this disclosure.

Figure 3:
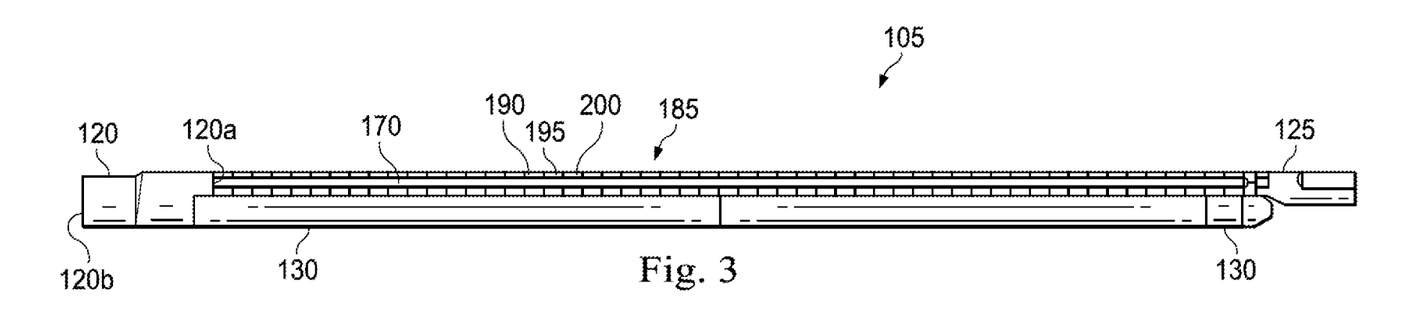
FIG. 3 is a side view of the multi-lateral junction assembly of FIGS. 1A and 1B, according to an exemplary embodiment of the present disclosure.
Figure 5:
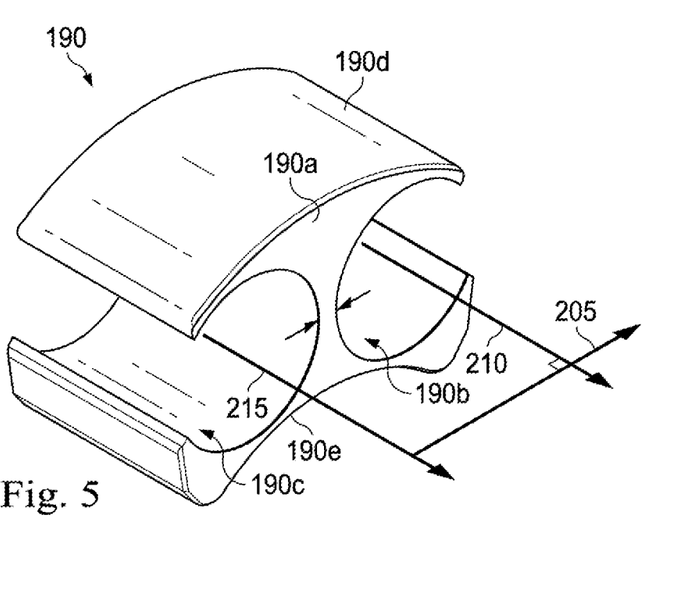
FIG. 5 is a perspective view of the lateral tubing support of FIG. 4, according to an exemplary embodiment of the present disclosure.

Referring now to FIG. 3, which is a side view of the assembly 105 when in a second configuration, such as when the first tubing string 125 has not yet been extended in the wellbore 90, is representatively illustrated. In this example, the assembly 105 includes a plurality of lateral tubing supports 185, including a first lateral tubing support 190, a second lateral tubing support 195, and a third lateral tubing support 200, and so on. Additionally referring to FIG. 4, which is a perspective, cross-sectional view of the first tubing string 125, each of the lateral tubing supports at least partially surrounds a portion of the first and second tubulars 165 and 170. Additionally referring to FIG. 5, which is a perspective view of the first lateral tubing support 190, the lateral tubing support 190 comprises an integrally formed solid body 190*a*; a first passage 190*b* extending through the integrally formed solid body 190*a*; and a second passage 190*c* extending through the integrally formed solid body 190*a*. In some embodiments, the body 190 is not an integrally formed solid body. The first and second passages 190*b* and 190*c* are spaced in parallel arrangement, with the first passage 190*b* being configured to at least partially encircle the first tubular 165 and the second passage 190*c* being configured to at least partially encircle the second tubular 170. Generally, the integrally formed solid body 190*a* extends continuously and uninterruptedly in a direction illustrated by the arrow identified by the numeral 205 in FIG. 5 ("direction 205") transverse to the parallel directions of extension of the first and second passages 190*b* and 190*c* illustrated by the arrows identified by the numerals 210 and 215 in FIG. 5 ("direction 210" and "direction 215"), respectively, from the first passage 190*b* to the second passage 190*c*. Generally, the addition of the first lateral tubing support 190 increases a radial compressive load rating and/or an axial compressive load rating of the lateral tubing string 125. In some embodiments, an exterior surface of the integrally formed solid body 190*a* forms a convex surface 190*d* and an opposing exterior surface of the integrally formed solid body forms a concave surface 190*e*. Generally, the concave surface 190*e* allows the first tubing string 125 to at least partially straddle the second tubing string 130 when the assembly 110 is in the second configuration. That is, the exterior concave surface 190*e* of the integrally formed solid body 190*a* is configured to at least partially straddle the second tubing string 130 when the assembly 105 is in the second configuration, thereby reducing the combined cross-section of the first and second tubing strings 125 and 130. Generally, the plurality of lateral tubing supports 185 shown in FIGS. 3-5 allows for a D-shape tubing to be omitted from the assembly 105, increases the burst and collapse rating of the assembly 105, and/or increases the flexibility of the assembly 105. In some embodiments, the first lateral tubing support 190 positions, or maintains the position of, the first and second tubing strings 125 and 130 in close proximity, which allows for the use of the first and second tubing strings 125 and 130 (instead of a single tubing string), with the first and second tubing strings 125 and 130 having smaller diameters than a single tubing string. Thus, the use of the first lateral tubing support 190 with the first and second tubing strings 125 and 130 increases the radial compressive load rating of the lateral tubing string 125, increases the burst and collapse rating of the assembly 105, and/or increases the flexibility of the assembly 105.

Figure 6:
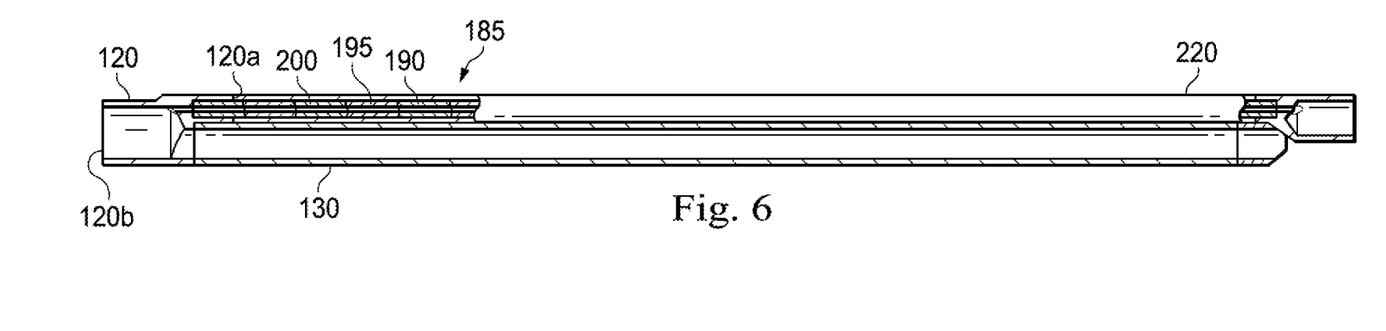
FIG. 6 is a partial cut-away side view of the multi-lateral junction assembly of FIGS. 1A and 1B according to another exemplary embodiment of the present disclosure, the multi-lateral junction assembly comprising a D-shaped tubing, a first lateral tubing support, a second lateral tubing support, and a main tubing.
Figure 7:
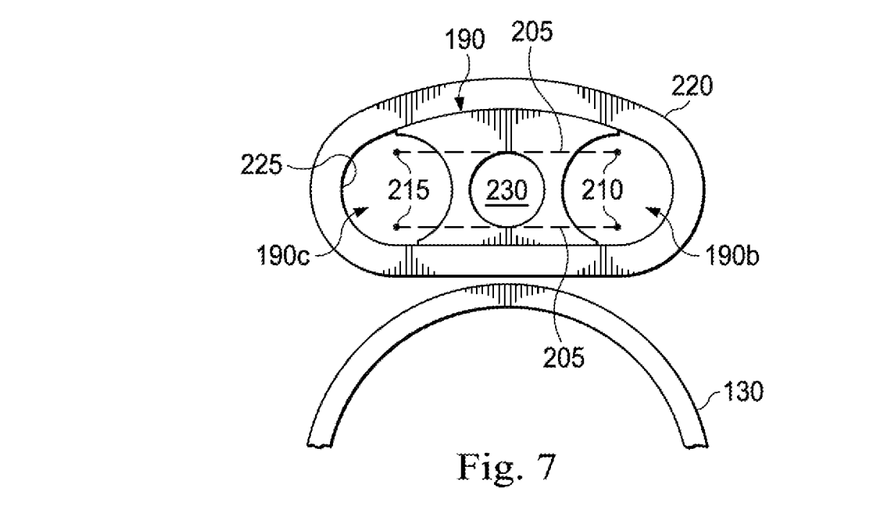
FIG. 7 is a partial cross-sectional view of the D-shaped tubing, a lateral tubing support, and a main tubing of FIG. 6, according to an exemplary embodiment of the present disclosure.
Figure 8:
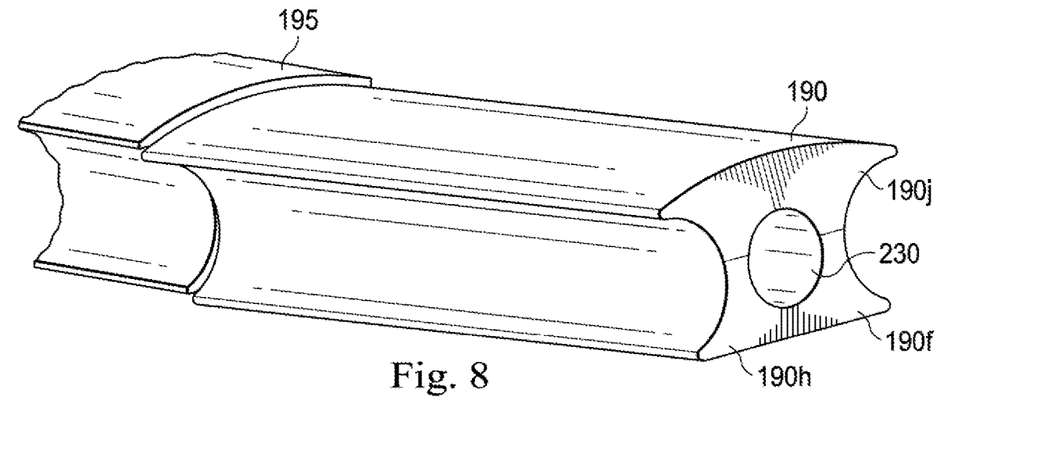
FIG. 8 is a perspective view of the first lateral tubing support and the second lateral tubing support of FIG. 6, according to an exemplary embodiment of the present disclosure.
Figure 9:
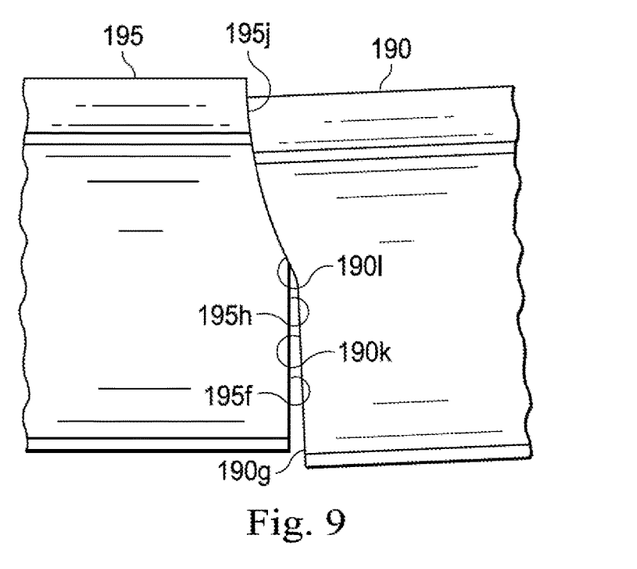
FIG. 9 is a side view of the first lateral tubing support and the second lateral tubing support of FIG. 7, according to an exemplary embodiment of the present disclosure.

In some embodiments, and as illustrated in FIGS. 6-8, the first lateral tubing string 125 may comprise a D-shaped tube 220 into which the plurality of lateral tubing supports 185, the first tubular 165, and the second tubular 170, extends (first and second tubulars 165 and 170 are not shown in FIGS. 6-8). Thus, at least the first lateral tubing support 190, the first tubular 165, and the second tubular 170 are accommodated within a 225 passage of the D-shaped tube 220. Thus, each of the plurality of lateral tubing supports 185 has a cross-section complementarily shaped relative to an interior of a generally D-shaped portion of a circle. As illustrated in FIGS. 7 and 8, a passage 230 longitudinally extends through the integrally formed body 190*a* of the first lateral tubing support 190 while maintaining the continuous and uninterrupted extension of the body 190*a* in the direction 205 that is transverse to the parallel directions 210, and 215 of extension of the first and second passages 190*b* and 190*c*. As illustrated in FIGS. 8 and 9, the integrally formed solid body 190*a* of the first lateral tubing support 190 has opposing end portions 190*f* and 190*g*. The end portion 190*f* of the first lateral tubing support 190*a* comprises a surface 190*h* that is substantially perpendicular (i.e., within 10 degrees) to the length of the integrally formed solid body 190*a* (defined in the direction 210 and/or 215) and a surface 190*j* that is angled inwardly relative to the surface 190*h*. The end portion 190*g* comprises a surface 190*k* that is substantially perpendicular to the length of the integrally formed solid body 190*a* and a second surface 190*l* that is angled outwardly relative to the first surface 190k and the integrally formed solid body 190a of the first lateral tubing support 190. As each lateral tubing support, such as the second and third lateral tubing supports, 195 and 200, is substantially identical or similar to the first lateral tubing support 190, the second and third lateral tubing supports 195 and 200 will not be described in further detail. Reference numerals used to refer to the features of the second and third lateral tubing supports 195 and 200 that are substantially identical to the features of the first lateral tubing support 190 will correspond to the reference numerals used to refer to the features of first lateral tubing support 190 except that the prefix for the reference numerals used to refer to the features of the second and third lateral tubing supports 195 and 200, that is, 195 and 200, will be replaced by the prefix of first lateral tubing support, that is, 190.

As can be seen from at least FIG. 6, the plurality of lateral tubing supports 185 are arranged in series within the D-shaped tubing 220. Generally, when in the second configuration and/or when little bending stresses are imposed upon the first tubing string 125, the end surface 190k engages the end surface 195f and the longitudinal axes of the first and second lateral tubing supports 190 and 195 are substantially co-linear and/or aligned. However, when in the first configuration and/or when additional bending stresses are imposed upon the first tubing string 125, the end surface 190l engages the end surface 195j, thereby allowing the allowing the first and second lateral tubing supports 190 and 195 to hinge relative to each other for flexibility. This hinging results in the longitudinal axes of the first and second lateral tubing supports 190 and 195 being offset and allows some bending of the first tubing string 125 while simultaneously increasing radial compressive load rating of the first tubing string 125. Generally, the plurality of lateral tubing supports 185 shown in FIGS. 6-9 requires no change in the external geometry of conventional or existing MIC junctions, strengths the D-shaped tube 220 while maintaining flexibility, is capable of being preloaded, and increases the collapse rating of the assembly 105.

Figures 10, 11:
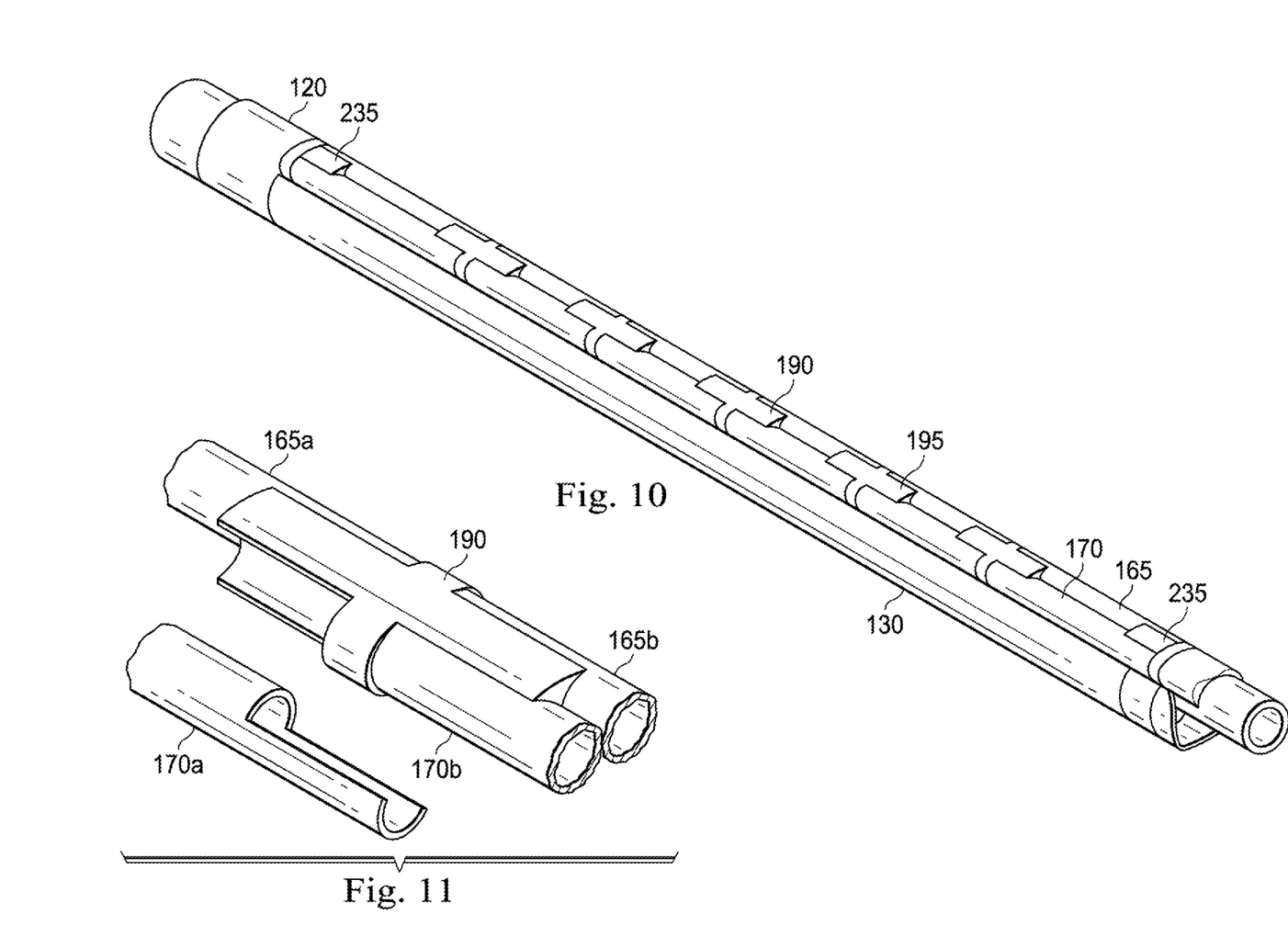
FIG. 10 is a perspective view of the multi-lateral junction assembly of FIGS. 1A and 1B according to yet another exemplary embodiment of the present disclosure, the multi-lateral junction assembly comprising a y-connector, a first and second lateral tubing, a lateral tubing support, and a main tubing.
FIG. 11 is a perspective view of a lateral tubing support and the first and second lateral tubings of FIG. 10, according to an exemplary embodiment.
Figure 12:
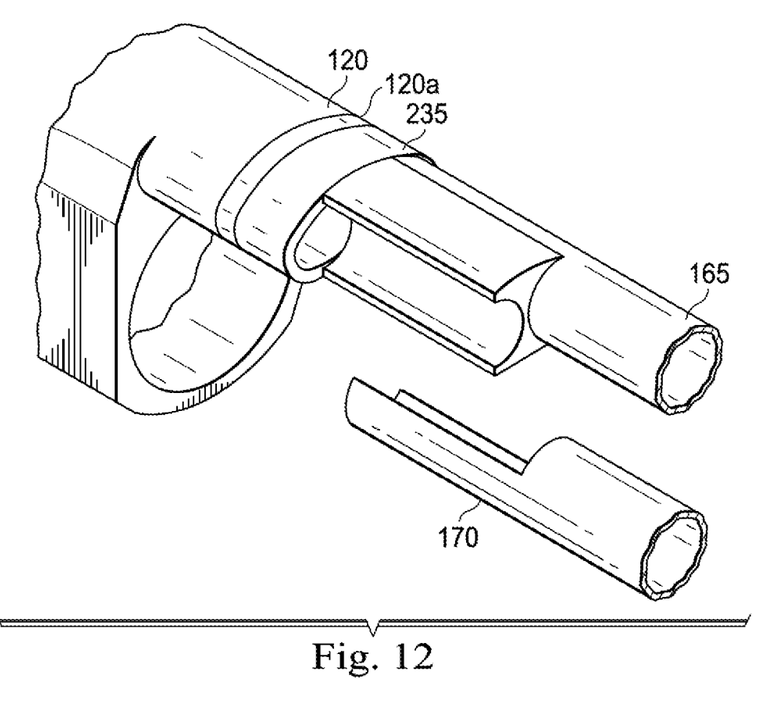
FIG. 12 is a perspective view of the first and second lateral tubings, a portion of the y-connector, and another lateral tubing support of FIG. 10, according to an exemplary embodiment.

Referring now to FIG. 10, which shows another embodiment of the multi-junction assembly 105, the plurality of lateral tubing supports 185 may be spaced longitudinally along the tubulars 165 and 170. As illustrated in FIG. 10, and in one embodiment of the first lateral tubing support 190, the body 190a of the support 190 may configured to fluidically connect and seal a plurality of tubing segments 165a and 165b that together form the first tubular 165. That is, the first and second passages 190b and 190c are interior passages formed within the body 190a that at least in part, form a portion of the tubulars 165 and 170. As shown in FIG. 11, the tubing segments 165a and 165b are connected to the first tubing support 190. The tubing segments 165a and 165b may be attached via welding, threading, bonding, brazing, and the like. Tubing segments 170a and 170b are connected to the first tubing support 190 in a similar fashion. As shown in FIG. 12, a lateral tubing support 235 from the plurality of lateral tubing supports 185 connects to the end 120a of the connector 120 when the end 120a is configured to connect with a D-shaped tubing. The lateral tubing support 235 is identical to the first lateral tubing support 190 as shown in FIG. 10 except that the end 190g is configured to couple to a D-shaped tubing connector. That is, the lateral tubing support 235 is a converter between a D-shaped tube to two tubing string while also providing additional support to the two tubulars 165 and 170. The embodiment as shown in FIGS. 10-12 depicts a welded plug-n-play embodiment that increase the burst and collapse rating of a conventional MIC junction from about 3,000 psi burst and 2,500 psi collapse in the unbent configuration up to the rating of 6,970 psi burst and 4,950 psi collapse. As shown in FIGS. 10 and 12, the lateral tubing support 235, which is a welded end adapter that is welded on the end 120a of the connector 120 to omit the use of a D-shaped tube. In one embodiment, the first tubular 165 is welded to the lateral tubing support 235 using a "rotated flat rolled 1G" or similar weld. The second tubular 170 is welded to the lateral tubing support 240 is fastened to the lateral tubing support 235 using conventional welding techniques. Accordingly, the use of the plurality of lateral tubing supports 185 as shown in FIGS. 10-12 allows a conventional MIC junction to be modified to accept the first and second tubulars 165 and 170 while almost doubling the burst and collapse rating associated with the MIC junction. While seven lateral tubing supports are illustrated in FIG. 10, any number of lateral tubing supports may be used to increase the stiffness of the first tubing string 125. Moreover, the first and second tubulars 165 and 170 may be threaded directly to the end 120a of the connector 120 and a D-to-round convertor using tubulars 165 and 170 having left-hand and right-handed threads. This results in an increase in collapse rating of 370% compared to conventional mini D-tube assemblies.

Figure 13:
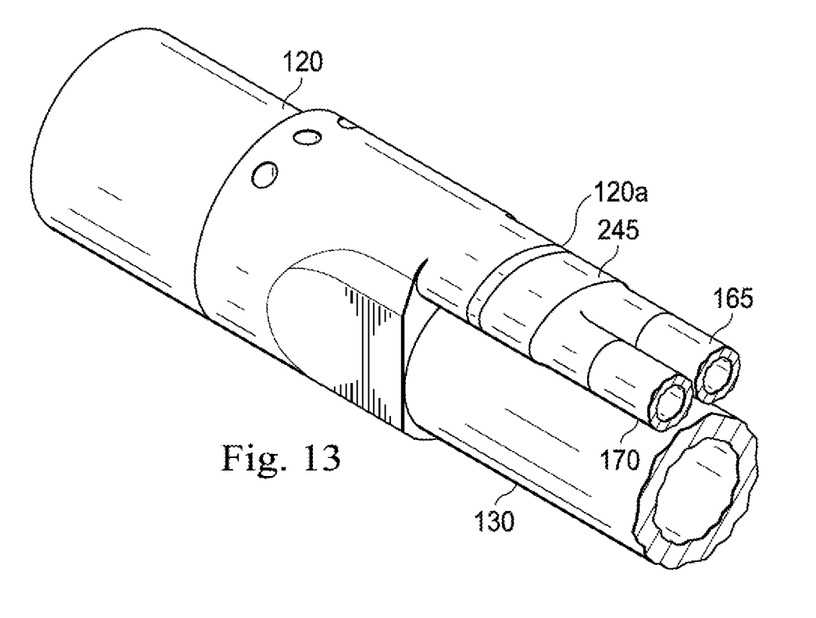
FIG. 13 is a perspective view of the multi-lateral junction assembly of FIGS. 1A and 1B according to yet another exemplary embodiment of the present disclosure, the multi-lateral junction assembly comprising, a y-connector and a lateral tubing support.
Figure 14:
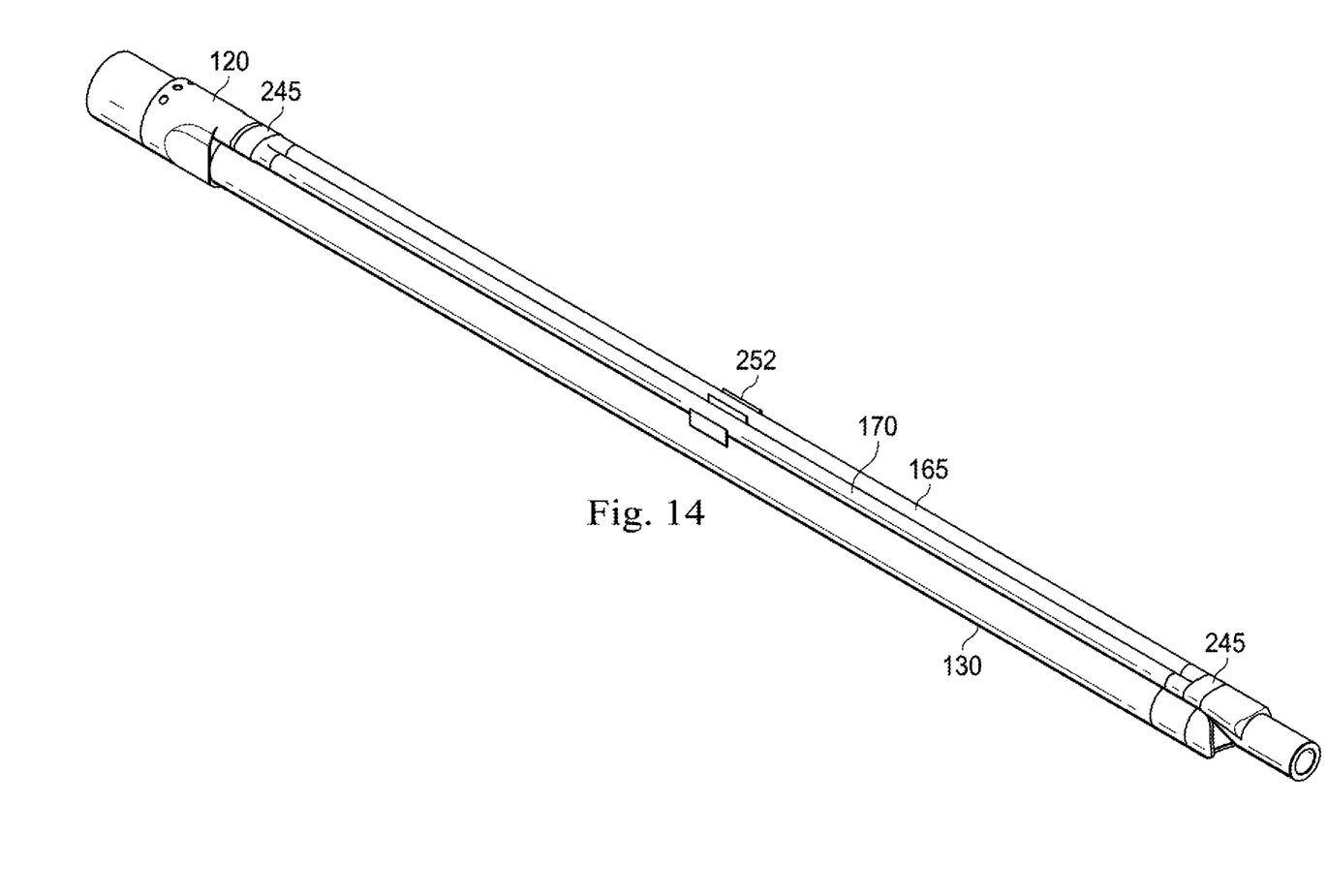
FIG. 14 is a perspective view of the multi-lateral junction assembly of FIG. 13, according to an embodiment of the present disclosure.

Another "plug-n-play" embodiment of the first tubing string 125 is depicted in FIGS. 13 and 14, which includes an adapter 245 that is welded to the end 120a of the connector 120 and that connects via a threaded connection the first and second tubulars 165 and 170. A stiffener 252 at least partially straddles each of the first and second tubulars 165 and 170 to secure the alignment of the tubulars 165 and 170. The stiffener 252 may be threaded, molded, bonded, welded, or clamped onto the first and second tubulars 165 and 170.

Figure 15:
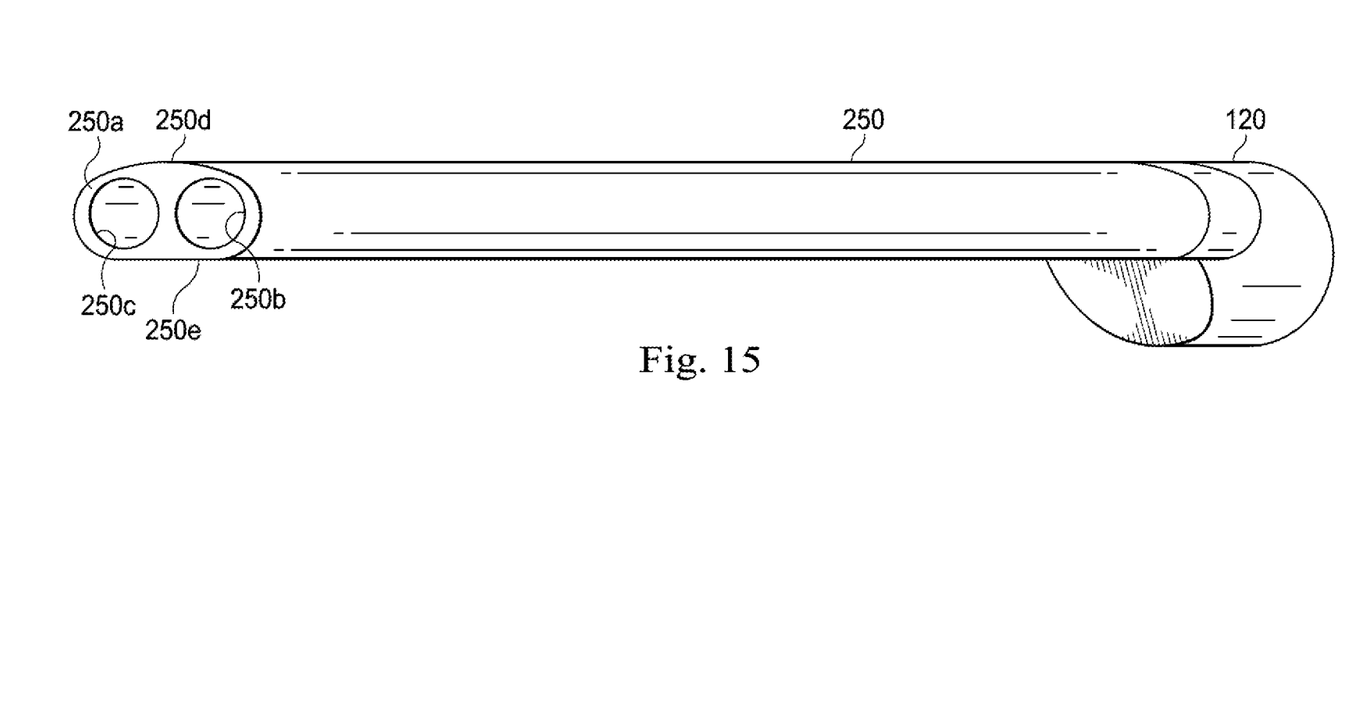
FIG. 15 is a perspective view of a multi-lateral junction assembly according to an embodiment of the present disclosure.

Referring now to FIG. 15, which shows another embodiment of the first tubing string 125, the plurality of lateral tubing supports 185 may be replaced with a lateral tubing support that is a conduit 250. In an exemplary embodiment, the conduit 250 includes a body 250a, a first passage 250b, a second passage 250c, and opposing surfaces 250d and 250e that are substantially identical to the body 190a, the first passage 190b, the second passage 190c, and opposing surfaces 190d and 190e of the body 190. Similar to the lateral tubing support 190, opposing ends (defined by the length of the body 250a) of the body 250a are configured to couple to a D-shaped tubing connector. Thus, the conduit 250, may be implemented with existing y-connectors 120 that include a D-shaped tubing connector. In some embodiments using the conduit 250, the tubulars 165 and 170 may be omitted from the first tubing string 125. Instead, the first passage 190b and the second passage 190c convey the fluid to the connector 120 and ultimately the production string 145. While not shown in FIG. 15, in some embodiments one or more passages longitudinally extend through the integrally formed solid body 250a of the conduit 250. In other embodiments, the conduit 250 may have a (outer) profile that is not D-shaped in order to enhance performance (i.e. decrease the section modulus so the first tubing string 125 is easier to flex, thereby reducing bending stresses) compared to a D-shaped outer profile.

In another embodiment, the conduit 250 may have a profile that is multi-shaped. That is, the outer profile of the conduit 250 changes along the length of the conduit 250. The outer profile of the conduit 250 at the ends, which are configured to connect to the y-connector 120 and the like, are different from the outer profile of the conduit 250 in the middle section (along the length) of the conduit 250 to provide the best properties for a given scenario (smaller section modulus to reduce bending stresses). In other exemplary embodiments, the ID (inner profile) also varies.

A method of installing the multi-lateral junction assembly 105 in the lateral wellbore 90 includes coupling each of a first tubing string 125 and a second tubing string 130 in a side-by-side arrangement to the end 120a of the connector 120. When assembling the first tubing string 125, the first tubular 165 is extended within the first passages 190b, 195b, and so on and the second tubular 170 is extended within the second passages 190c, 195c, and so on. There may be multiple tubulars 165 that are attached to the ends of the first lateral tubing support 190. Thus, the plurality of lateral tubing supports 185 is arranged in series along the length of the first tubing string 125. When the assembly 105 includes the D-shaped tube 220, the plurality of lateral tubing supports 185, the first tubular 165 (not shown in FIGS. 6 and 7), and the second tubular 170 (not shown in FIGS. 6 and 7) are accommodated within the D-shaped tube. However, in some embodiments, the first tubular 165 and the second tubular 170 are omitted from the assembly 105. The multi-lateral junction assembly 105 is then installed in the well. In some embodiments, a portion of the multi-lateral junction assembly, such as the second tubing string 130 and/or the y-shaped connector 120, is initially positioned in the well. After the second tubing string 130 and/or the y-shaped connector 12 is positioned in the lateral wellbore 90, the first tubing string 125 is positioned within the well and coupled to the end 120a of the y-shaped connector 120.

This includes extending the first tubing string 125 within at least a portion of the lateral wellbore 90. This can result in the first tubing string 125 flexing and the end surfaces 190l, 195l, engage the end surfaces 195j, 200j, respectively, thereby allowing the first, second, and third supports 190, 195, 200 to hinge relative to each other. This hinging results in the longitudinal axes of the first, second, and third lateral tubing supports 190, 195, 200 being offset and allows some bending of the first tubing string 125 while simultaneously increasing radial compressive load rating of the first tubing string 125. The method may also include controlling a flow of fluid from the second tubing string 130 into the production string 145 using the flow control device 140 and controlling a flow of fluid from the first tubing string 125 into the production string 145 using the flow control device 150.

In an exemplary embodiment, the lateral tubing supports and/or conduit 190, 195, 235, 250 etc. results in the assembly 105 having an increased axial and radial compression rating compared to conventional MIC junctions. Thus, the lateral tubing supports and/or conduit 190, 195, 235, 250 etc. results in an increased burst and collapse rating of the assembly 105. Moreover, the lateral tubing supports and/or conduit 190, 195, 235, 250 etc. allow for the assembly 105 to not require welds, as the first lateral tubing 125 may instead include threaded connections. Additionally, the lateral tubing supports and/or conduit 190, 195, 235, 250 etc. allows for a "plug-n-play" arrangement for use with an assembly or the y-connector 120 configured to connect with a D-shape tube. While only a single passage (passage 230) was shown extending through the body 190a, each lateral tubing support may include one or more similar passages to accommodate control lines that extend into and through the first tubing string 125. In one embodiment, each of the plurality of lateral tubing supports 185 is distinct and detachable from the first tubular 165 and the second tubular 170. In an exemplary embodiment, each of the assembly 105 and each of the elements that form the assembly 105 is a downhole apparatus.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Thus, a downhole apparatus has been described. Embodiments of the apparatus may generally include a first lateral tubing support that includes an integrally formed solid body; a first passage extending through the integrally formed solid body; and a second passage extending through the integrally formed solid body; wherein the first and second passage are spaced in parallel arrangement; and wherein the integrally formed solid body extends continuously and uninterruptedly in a direction transverse to the parallel directions of extension of the first and second passages, from the first passage to the second passage. For any of the foregoing embodiments, the apparatus may include any one of the following elements, alone or in combination with each other:

- A lateral tubing string including a first tubular and a second tubular spaced in parallel arrangement; wherein the first passage is configured to at least partially encircle the first tubular; wherein the second passage is configured to at least partially encircle the second tubular; and wherein the first lateral tubing support increases a radial compressive load rating of the lateral tubing string.
- The first lateral tubing support is distinct and detachable from the first tubular and the second tubular.
- The lateral tubing string includes a D-shaped tube; and the first lateral tubing support is accommodated within an interior passage of the D-shaped tube.
- The integrally formed solid body of the first lateral tubing support has opposing end portions; the downhole apparatus further includes a second lateral tubing support similar to the first lateral tubing support; and an end portion of the first lateral tubing support engages an end portion of the second lateral tubing support.
- The end portion of the first lateral tubing support includes a first surface that is substantially perpendicular to the length of the integrally formed solid body of the first lateral tubing support and a second surface that is angled outwardly relative to the first surface and the integrally formed solid body of the first lateral tubing support.
- The end portion of the second lateral tubing support includes a third surface that is substantially perpendicular to the length of the integrally formed solid body of the second lateral tubing support and a fourth surface that is angled inwardly relative to the third surface and the integrally formed solid body of the second lateral tubing support.
- Engagement of the second surface of the first support and the fourth surface of the second support allows the first and second supports to hinge relative to each other.

An exterior surface of the integrally formed solid body forms a convex surface and an opposing exterior surface of the integrally formed solid body forms a concave surface.

The first lateral tubing support has a cross-section complementarily shaped relative to an interior of a generally D-shaped portion of a circle.

A y-shaped tubing string connector to which the lateral tubing string is connected to one end.

A main tubing string connected to the one end of the y-shaped tubing string connector.

The main tubing string forms an interior passageway sized to accommodate another tubing string, such as a production string or an injection string, having an control valve formed therein that is configured to control a flow of fluid from the lateral tubing string into the production string.

The main tubing string has a circular cross-section; wherein at least a portion of the lateral tubing string has a non-circular cross-section; and wherein the lateral tubing string comprises an adapter between a circular cross-section and a non-circular cross section An exterior surface of the integrally formed solid body is configured to at least partially straddle the main tubing string.

Thus, a method of installing a multi-lateral junction assembly in a subterranean well has been described. Embodiments of the method may generally include, coupling each of a first tubing string and a second tubing string of the multi-lateral junction assembly in a side-by-side arrangement to one end of a y-shaped tubing string connector that also forms a portion of the multi-lateral junction assembly; wherein the first tubing string is a lateral tubing string comprising a first tubular and a second tubular in a side-by-side arrangement; engaging each of the first and second tubulars with a first lateral tubing support to maintain a position of the first tubular relative to the second tubular; and positioning at least a portion of the multi-lateral junction assembly in the well. For any of the foregoing embodiments, the method may include any one of the following elements, alone or in combination with each other:

The first lateral tubing support includes a body; a first passage extending through the body and configured to at least partially encircle the first tubular; and a second passage extending through the body and configured to at least partially encircle the second tubular; wherein the first and second passages are spaced in parallel arrangement; and wherein the body extends continuously and uninterruptedly in a direction transverse to the parallel directions of extension of the first and second passages, from the first passage to the second passage; and wherein engaging each of the first and second tubulars with the first lateral tubing support increases a radial compressive load rating of the lateral tubing string and/or increases an axial compressive load rating of the lateral tubing string The first lateral tubing support increases a radial compressive load rating of the lateral tubing string.

Extending another tubing string through a passage formed within the y-shaped tubing string connector and through the second tubing string to form an annulus between the another tubing string and the second tubing string; and controlling a flow of fluid from the annulus and into the production string.

Controlling a flow of fluid from the first tubing string into the another tubing string The second tubing string has a generally circular cross-section; wherein at least a portion of the first tubing string has a non-circular cross-section; and wherein the first lateral tubing support is accommodated within a passage of the first tubing string.

The first tubing string includes a D-tube; and wherein the first lateral tubing support, the first tubular, and the second tubular are accommodated within a passage of the D-tube.

The integrally formed solid body of the first lateral tubing support has opposing end portions.

The assembly further includes a second lateral tubing support similar to the first lateral tubing support.

An end portion of the first lateral tubing support engages an end portion of the second lateral tubing support.

The end portion of the first lateral tubing support includes a first surface that is substantially perpendicular to the length of the integrally formed solid body of the first lateral tubing support and a second surface that is angled outwardly relative to the first surface and the integrally formed solid body of the first lateral tubing support; wherein the end portion of the second lateral tubing support includes a third surface that is substantially perpendicular to the length of the integrally formed solid body of the second lateral tubing support and a fourth surface that is angled inwardly relative to the third surface and the integrally formed solid body of the second lateral tubing support; and wherein installing the multi-lateral junction assembly in the well includes engaging the second surface of the first support with the fourth surface of the second support thereby allowing the first and second supports to hinge relative to each other.

A passage longitudinally extends through the integrally formed solid body of the first lateral tubing support.

An exterior surface of the integrally formed solid body forms a convex surface and an opposing exterior surface of the integrally formed solid body forms a concave surface.

The first lateral tubing support has a cross-section complementarily shaped relative to an interior of a generally D-shaped portion of a circle.

Providing a tubing string, such as a production string or an injection string, that extends through a passage formed within the y-shaped tubing string connector and through the second tubing string.

Controlling a flow of fluid from the second tubing string into the production string using a first valve positioned along the production string.

Controlling a flow of fluid from the first tubing string into the production string using a second valve positioned along the production string.

The portion of the multi-lateral junction assembly positioned in the well comprises the y-shaped tubing string connector and coupling the first tubing string to the end of the y-shaped tubing string connector occurs after the y-shaped tubing string connector is positioned within the well.

Extending a production string through a passage formed within the y-shaped tubing string connector and through the second tubing string to form an annulus between the production string and the second tubing string; and controlling a flow of fluid from the annulus and into the production string Thus, a wellbore junction assembly has been described. Embodiments of the assembly may generally include, a first tubular string having a generally circular cross-section and forming an interior passageway sized to accommodate a tubing string; a second tubular string having a first compression load rating, wherein at least a portion of the second tubular string has non-circular cross-section; a tubular string connector having first and second opposite ends, wherein each of the first and second tubular strings is secured to the first opposite end; and a tubing support coupled to the second tubular string, wherein the tubing support and second tubular string have a second compression load rating that is greater than the first compression load rating. For any of the foregoing embodiments, the assembly may include any one of the following elements, alone or in combination with each other:

The second tubular string includes a first tubular and a second tubular spaced in parallel arrangement; and wherein the tubing support maintains a position of the first tubular relative to the second tubular.

The second tubular string includes a plurality of axially-attached segments.

The tubing support comprises a body having a non-circular cross-section; wherein a first and second passageway extend in a longitudinal direction through the body.

Thus, a means of installing a multi-lateral junction assembly in a subterranean well has been describes that includes means for coupling each of a first tubing string and a second tubing string of the multi-lateral junction assembly in a side-by-side arrangement to one end of a y-shaped tubing string connector that also forms a portion of the multi-lateral junction assembly; wherein the first tubing string is a lateral tubing string comprising a first tubular and a second tubular in a side-by-side arrangement; means for engaging each of the first and second tubulars with a first lateral tubing support; wherein the first lateral tubing support comprises: an integrally formed solid body; a first passage extending through the integrally formed solid body and configured to at least partially encircle the first tubular; and a second passage extending through the integrally formed solid body and configured to at least partially encircle the second tubular; means for spacing the first and second passages in parallel arrangement; and means for the integrally formed solid body extending continuously and uninterruptedly in a direction transverse to the parallel directions of extension of the first and second passages, from the first passage to the second passage. Thus, a means of installing a multi-lateral junction assembly in a subterranean well that includes means for coupling a first tubing string of the multi-lateral junction assembly to one end of a y-shaped tubing string connector that also forms a portion of the multi-lateral junction assembly; and running the assembly into a well. Then a second tubing string is ran into the well with means for coupling the second tubing string into one end of a y-shaped tubing string connector that also forms a portion of the multi-lateral junction assembly; wherein the second tubing string is a lateral tubing string.

Thus, a means for increasing the compression rating (radial and axial), burst rating of a conduit (tubular leg) extending from a mainbore to a lateral wellbore incudes a means for coupling more than one conduit (tube) together to create a higher-rated lateral leg; a means for spacing the first and second passages in parallel arrangement; and an integrally formed solid body extending continuously and uninterruptedly in a direction transverse to the parallel directions of extension of the first and second passages, from the first passage to the second passage. Wherein a means is provided for a flow path through two tubulars that is greater in area than a leg with a single flow path with a similar collapse (or radial compression) rating.

The foregoing description and figures are not drawn to scale, but rather are illustrated to describe various embodiments of the present disclosure in simplistic form. Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Accordingly, the intention is to cover all modifications, equivalents and alternatives falling within the spirit and scope of the disclosure as defined by the appended claims.

It is understood that variations may be made in the foregoing without departing from the scope of the disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

What is claimed is:

1. A downhole apparatus, comprising:
   a lateral tubing string comprising a first lateral tubing support;
   wherein at least a portion of the lateral tubing string has a D-shaped cross-section;
   wherein the first lateral tubing support (i) forms an integral portion of the lateral tubing string or (ii) is a detachable component of the lateral tubing string; and
   wherein the lateral tubing string comprises a first passage and a second passage therethrough, the first and second passages being spaced from and parallel to each other and each having a circular cross-section.

2. The downhole apparatus of claim 1,
   wherein the lateral tubing string comprises a first tubular and a second tubular spaced in parallel arrangement;
   wherein the first lateral tubing support is distinct and detachable from the first tubular and the second tubular.

3. The downhole apparatus of claim 1,
   wherein the first lateral tubing support has opposing end portions;
   wherein the downhole apparatus further comprises a second lateral tubing support identical to the first lateral tubing support; and
   wherein one of the opposing end portions of the first lateral tubing support engages an end portion of the second lateral tubing support.

4. The downhole apparatus of claim 3,
   wherein the one of the opposing end portions of the first lateral tubing support comprises a first surface that is substantially perpendicular to the length of the first lateral tubing support and a second surface that is angled outwardly relative to the first surface and the first lateral tubing support;
   wherein the end portion of the second lateral tubing support comprises a third surface that is substantially perpendicular to the length of the second lateral tubing support and a fourth surface that is angled inwardly relative to the third surface and the second lateral tubing support; and wherein engagement of the second surface of the first support and the fourth surface of the second support allows the first and second supports to hinge relative to each other.

5. The downhole apparatus of claim 1, wherein the first lateral tubing support has a cross-section complementarily shaped relative to an interior of a generally D-shaped portion of a circle.

6. The downhole apparatus of claim 1, further comprising:
a y-shaped tubing string connector to which the lateral tubing string is connected at one end of the y-shaped tubing string connector; and
a main tubing string connected to the one end of the y-shaped tubing string connector;
wherein the main tubing string forms an interior passageway sized to accommodate another tubing string.

7. The downhole apparatus of claim 6, wherein the main tubing string has a circular cross-section; and wherein the lateral tubing string comprises an adapter between a circular cross-section and the D-shape cross-section of at least a portion of the lateral tubing string.

8. The downhole apparatus of claim 1, wherein the first lateral tubing support comprises a central bore therethrough.

9. A method of positioning a multi-lateral junction assembly in a subterranean well, the method comprising:
coupling each of a first tubing string and a second tubing string of the multi-lateral junction assembly in a side-by-side arrangement to one end of a y-shaped tubing string connector that also forms a portion of the multi-lateral junction assembly;
wherein the first tubing string is a lateral tubing string having a D-shaped cross-section and comprising a first passage and a second passage in a side-by-side arrangement, the first and second passages each having a circular cross-section;
wherein the first tubing string further comprises a first lateral tubing support to maintain a position of the first passage relative to the second passage; and
positioning at least a portion of the multi-lateral junction assembly in the well.

10. The method of claim 9,
wherein the first tubing string comprises a first tubular and a second tubular; and
wherein the first lateral tubing support comprises:
a body;
a first support passage extending through the body and configured to at least partially encircle the first tubular; and
a second support passage extending through the body and configured to at least partially encircle the second tubular;
wherein the first and second passages are spaced from and parallel to each other; and
wherein the body extends continuously and uninterruptedly in a direction transverse to a direction of extension of the first and second support passages, from the first support passage to the second support passage; and
wherein engaging each of the first and second tubulars with the first lateral tubing support increases a radial compressive load rating of the lateral tubing string and/or increases an axial compressive load rating of the lateral tubing string.

11. The method of claim 10,
wherein the body of the first lateral tubing support has opposing end portions;
wherein the assembly further comprises a second lateral tubing support identical to the first lateral tubing support; and
wherein one of the opposing end portions of the first lateral tubing support engages an end portion of the second lateral tubing support.

12. The method of claim 9, wherein the second tubing string has a generally circular cross-section; and wherein the first lateral tubing support is accommodated within a passage of the first tubing string.

13. The method of claim 9, wherein the portion of the multi-lateral junction assembly positioned in the well comprises the y-shaped tubing string connector and coupling the first tubing string to the end of the y-shaped tubing string connector occurs after the y-shaped tubing string connector is positioned within the well.

14. The method of claim 9, further comprising:
extending another tubing string through a passage formed within the y-shaped tubing string connector and through the second tubing string to form an annulus between the another tubing string and the second tubing string or the y-shaped tubing string connector; and
controlling a flow of fluid from the annulus and into the another tubing string.

15. The method of claim 14, further comprising controlling a second flow of fluid from the first tubing string into the another tubing string.

16. The method of claim 9, wherein the first lateral tubing support comprises a central bore therethrough.

17. A wellbore junction assembly, comprising:
a first tubing string having a generally circular cross-section and forming an interior passageway sized to accommodate a tubing string;
a second tubing string comprising a tubing support along a portion of thereof, wherein at least a portion of the second tubing string has non-circular cross-section and the second tubing string comprises two passages therethrough each having a circular cross-section;
a tubing string connector having first and second opposite ends, wherein each of the first and second tubing strings is secured to the first opposite end; and
wherein a portion of the second tubing string does not include the tubing support and has a first compression load rating and the portion of the second tubing string comprising the tubing support has a second compression load rating that is greater than the first compression load rating.

18. The wellbore junction assembly of claim 17, wherein the second tubing string comprises a first tubular and a second tubular spaced from and parallel to each other; and wherein the tubing support maintains a position of the first tubular relative to the second tubular.

19. The wellbore junction assembly of claim 18, wherein the second tubing string comprises a plurality of axially-attached segments.

20. The wellbore junction assembly of claim 17, wherein the tubing support comprises a body having a non-circular cross-section; and wherein a first and second passageway extend in a longitudinal direction through the body.

* * * * *